United States Patent
Athauda et al.

(10) Patent No.: US 10,295,169 B2
(45) Date of Patent: May 21, 2019

(54) VISIBILITY-ENHANCING DEVICE FOR TEXTILE OR FABRIC ATTACHMENT

(71) Applicant: MAS Active Trading Pvt Limited, Colombo (LK)

(72) Inventors: Tharindu Athauda, Colombo (LK); Nadeeshani Gunathilake, Colombo (LK); Kireety Madiraju, Colombo (LK)

(73) Assignee: MAS ACTIVE TRADING PVT LTD., Colombo (LK)

( * ) Notice: Subject to any disclaimer, the term of this patent is extended or adjusted under 35 U.S.C. 154(b) by 0 days.

(21) Appl. No.: 15/546,610

(22) PCT Filed: Dec. 30, 2015

(86) PCT No.: PCT/SG2015/050515
§ 371 (c)(1),
(2) Date: Jul. 26, 2017

(87) PCT Pub. No.: WO2016/122400
PCT Pub. Date: Aug. 4, 2016

(65) Prior Publication Data
US 2018/0017248 A1 Jan. 18, 2018

(30) Foreign Application Priority Data
Jan. 27, 2015 (GB) .................................. 1501297.4

(51) Int. Cl.
*D02G 3/44* (2006.01)
*F21V 19/00* (2006.01)
(Continued)

(52) U.S. Cl.
CPC ............ *F21V 33/0008* (2013.01); *A41B 1/08* (2013.01); *A41B 11/00* (2013.01); *A41D 1/06* (2013.01);
(Continued)

(58) Field of Classification Search
CPC .................................................. F21V 33/0008
See application file for complete search history.

(56) References Cited

U.S. PATENT DOCUMENTS 4,602,191 A 7/1986 Davila
4,774,434 A 9/1988 Bennion
(Continued)

FOREIGN PATENT DOCUMENTS

CN 103423687 A 12/2013
CN 203322810 U 12/2013
(Continued)

OTHER PUBLICATIONS

International Search Report and Written Opinion dated Mar. 15, 2016 for Application No. PCT/SG2015/050515.
(Continued)

*Primary Examiner* — Alexander K Garlen
(74) *Attorney, Agent, or Firm* — Patterson + Sheridan, LLP (57) ABSTRACT

Disclosed herein is a visibility-enhancing device that requires the presence of a textile or fabric having an internal surface and an external surface; and a flexible and conformable visible light source apparatus attached to the textile or fabric, wherein the visible light source apparatus comprises: at least one visible light source that is positioned towards the internal surface of the textile or fabric and/or is positioned to provide light at an angle that is substantially perpendicular to the internal surface of the textile or fabric; at least two conductive members having a first end and a second end.

19 Claims, 9 Drawing Sheets

(51) Int. Cl.

| | |
|---|---|
| F21V 23/02 | (2006.01) |
| F21V 23/06 | (2006.01) |
| F21V 33/00 | (2006.01) |
| A41B 1/08 | (2006.01) |
| A41D 1/06 | (2006.01) |
| A42B 1/24 | (2006.01) |
| A43B 3/00 | (2006.01) |
| F21S 9/02 | (2006.01) |
| F21V 3/00 | (2015.01) |
| F21V 7/04 | (2006.01) |
| A41B 11/00 | (2006.01) |
| A41D 13/01 | (2006.01) |
| A41D 27/08 | (2006.01) |
| A41D 29/00 | (2006.01) |
| B65D 30/00 | (2006.01) |
| B65D 33/00 | (2006.01) |
| F21V 23/04 | (2006.01) |
| H05B 37/02 | (2006.01) |
| F21Y 115/10 | (2016.01) |
| F21Y 115/15 | (2016.01) |
| F21Y 115/20 | (2016.01) |

(52) U.S. Cl.

CPC ........... *A41D 13/01* (2013.01); *A41D 27/085* (2013.01); *A41D 29/00* (2013.01); *A42B 1/242* (2013.01); *A43B 3/001* (2013.01); *B65D 29/00* (2013.01); *B65D 33/004* (2013.01); *D02G 3/441* (2013.01); *F21S 9/02* (2013.01); *F21V 3/00* (2013.01); *F21V 7/04* (2013.01); *F21V 19/0015* (2013.01); *F21V 23/02* (2013.01); *F21V 23/0442* (2013.01); *F21V 23/0464* (2013.01); *F21V 23/0471* (2013.01); *F21V 23/06* (2013.01); *H05B 37/0218* (2013.01); *H05B 37/0236* (2013.01); *A41D 2600/20* (2013.01); *F21Y 2115/10* (2016.08); *F21Y 2115/15* (2016.08); *F21Y 2115/20* (2016.08)

(56) References Cited

U.S. PATENT DOCUMENTS

| | | | | |
|---|---|---|---|---|
| 4,924,362 | A * | 5/1990 | Janko | A01K 27/006 |
| | | | | 362/108 |
| 5,128,843 | A | 7/1992 | Guritz | |
| 5,455,749 | A * | 10/1995 | Ferber | A41D 1/005 |
| | | | | 362/103 |
| 5,836,671 | A | 11/1998 | Chien | |
| 2001/0004808 | A1 | 6/2001 | Hurwitz | |
| 2006/0269744 | A1 | 11/2006 | Murasko et al. | |
| 2007/0053179 | A1 | 3/2007 | Pang et al. | |
| 2007/0056074 | A1 | 3/2007 | Esses | |
| 2008/0010877 | A1 | 1/2008 | Deflin et al. | |
| 2008/0089056 | A1 * | 4/2008 | Grosjean | B60Q 1/2673 |
| | | | | 362/103 |
| 2009/0201672 | A1 | 8/2009 | Lee | |
| 2010/0039802 | A1 | 2/2010 | Tuan | |
| 2010/0065873 | A1 | 3/2010 | Bhattacharya et al. | |
| 2010/0226117 | A1 | 9/2010 | Krans et al. | |
| 2011/0199758 | A1 * | 8/2011 | Yeh | F21V 33/0008 |
| | | | | 362/184 |
| 2011/0199779 | A1 * | 8/2011 | Chu | F21V 33/0008 |
| | | | | 362/551 |
| 2011/0215086 | A1 * | 9/2011 | Yeh | F21V 23/02 |
| | | | | 219/488 |
| 2011/0235311 | A1 | 9/2011 | Stone | |
| 2011/0305006 | A1 * | 12/2011 | Hehenberger | A41D 13/01 |
| | | | | 362/103 |
| 2012/0099298 | A1 | 4/2012 | Hsu | |
| 2012/0155065 | A1 * | 6/2012 | Ubaghs | F21V 33/0008 |
| | | | | 362/103 |
| 2013/0027963 | A1 | 1/2013 | Van Herpen et al. | |
| 2013/0077289 | A1 * | 3/2013 | Gridley | A41D 27/085 |
| | | | | 362/103 |
| 2013/0094189 | A1 * | 4/2013 | Kimitri | A41D 13/01 |
| | | | | 362/108 |
| 2014/0354153 | A1 * | 12/2014 | Pulido, Jr. | H05B 33/0854 |
| | | | | 315/77 |
| 2014/0376209 | A1 * | 12/2014 | Leung | F21V 33/0008 |
| | | | | 362/103 |

FOREIGN PATENT DOCUMENTS

| | | |
|---|---|---|
| GB | 2396252 A | 6/2004 |
| TW | 200927005 A | 7/2009 |
| WO | 2009/075550 A2 | 6/2009 |

OTHER PUBLICATIONS

UK Search Report dated Jun. 2, 2015 for Application No. GB1501297.4.
ISR and WO of PCT/SG2015/050514, dated Mar. 15, 2016.
ACS Nano, 2010, 4(10), 5827-5834.
Pain Res. Manage., 2006, 11(3), 193-196.
J. Clin. Monit. Comput., 1999, 15(7-8), 441-447.
Chinese Office Action (with English translation) for corresponding CN 201580078283.4, dated Dec. 10, 2018.
Chinese Office Action (with English translation) for corresponding CN 201580078303.8, dated Dec. 10, 2018.
International Search Report and Written Opinion issued in PCT/SG2015/050514, dated Mar. 15, 2016.
"Scratch-Resisitant, Highly Conductive and High-Strength Carbon Nanotube-Based Composite Yarns," Kal Liu, et al., ACS Nano, vol. 4, No. 10, pp. 5827-5834, published Sep. 10, 2010.
"Infrared therapy for chronic low back pain: A randomized, controlled trial," George D. Gale, et al., Pain Res. Manage., vol. 11, No. 3, pp. 193-196, published Autumn 2006.
"A Comparison of Pulse Oximetry and Near Infrared Spectroscopy (NIRS) in the Detection of Hypoxaemia Occurring with Pauses in Nasal Airflow in Neonates," S. L. Watkin, et al., Journal of Clinical Monitoring and Computing, vol. 15, Nos. 7-8, pp. 441-447, published Dec. 1999.
Chinese Office Action issued in Chinese Patent Application No. 201580078283.4, dated Dec. 10, 2018 (with English translation).
Chinese Office Action issued in Chinese Patent Application No. 201580078303.8, dated Dec. 10, 2018 (with English translation).
"Cerebral Oximetry, Emerging Applications for an Established Technology," Elizabeth A. M. Frost, MD, Anesthesiology News, Special Edition, pp. 27-34, published Oct. 2012.

* cited by examiner

VISIBILITY-ENHANCING DEVICE FOR TEXTILE OR FABRIC ATTACHMENT

FIELD OF INVENTION

The current application relates to high-visibility textiles or fabrics that include flexible and conformable visible light strips for providing illumination that are also washable as part of the textile or fabric. The washed garment remains functional after washing. In particular, the current invention relates to garments that incorporate a flexible visible light illumination device.

BACKGROUND

The listing or discussion of an apparently prior-published document in this specification should not necessarily be taken as an acknowledgement that the document is part of the state of the art or is common general knowledge.

Workers, commuters, children and exercisers may all have to venture outside in low-light conditions for various reasons. However, venturing outside in such conditions can be potentially dangerous because it may be difficult for others (e.g. a driver of a motor vehicle) to distinguish the person when the light levels are low. This can lead to feelings of discomfort, anxiety and danger in the person who has to venture outside.

In order to improve the visibility of people outside, light coloured clothing has been used to help provide observers a greater chance of spotting a person outside in low-light conditions. To help improve visibility further, passive reflective elements in apparel are also often used. Light clothing and passive elements only really help to increase visibility when light from an external visible light source, like street lighting or light from a vehicle's headlamps, strikes the person.

To improve safety for people having to venture outside in low-light conditions, various garments have been developed that contain some sort of lighting device integrated into or onto said garment. However, to date, these lighting devices have suffered from various problems, such as being bulky and uncomfortable to wear, having to remove the lighting device from the garment before washing, lack of shock resistance and a lack of resistance to local (e.g. caused by the body of the wearer) or more general (e.g. the weather) environmental conditions.

Thus, there remains a need for a garment that is more comfortable and useable by an individual who needs to operate in low-light conditions. Further, there is also a need for an easy to maintain garment that does not require significant time to disassemble and reassemble before and after washing, respectively. Yet further, there remains a need for garments that integrate electronic component parts that are thin (e.g. a single layer of fabric), but where the electronic components do not make the garment uncomfortable for the wearer.

SUMMARY OF INVENTION

In a first aspect of the invention, there is provided a visibility-enhancing device comprising a textile or fabric having an internal surface and an external surface and a flexible and conformable visible light source apparatus attached to the textile or fabric, wherein the visible light source apparatus comprises at least one visible light source that is positioned towards the internal surface of the textile or fabric and/or is positioned to provide light at an angle that is substantially perpendicular to the internal surface of the textile or fabric, at least two conductive members having a first end and a second end, the first end is connected to the at least one visible light source and the second end is adapted to connect to a power source and at least one transparent polymer layer that encapsulates the entirety of the at least one visible light source and at least part of the at least two conductive members.

In an embodiment of the invention, the visible light source may be selected from one or more of the group consisting of a light emitting diode (LED), an organic light emitting diode (OLED) and an electroluminescent material, optionally wherein the visible light source further comprises an optical channelling device (e.g. an optical fibre). In particular embodiments of the invention that may be mentioned herein the visible light source is an LED or and OLED.

In certain embodiments of the invention, the visible light source may be attached to the textile or fabric by the at least one transparent polymer layer.

In further embodiments of the invention, the flexible and conformable visible light source apparatus may further comprise at least one flexible substrate with at least one electrical circuit thereon, where the at least one visible light source is attached to the at least one flexible substrate through the at least one electrical circuit and the at least one electrical circuit is connected to the at least two conductive members. In certain embodiments, the at least one visible light source may be attached to the at least one electrical circuit by an isotropic conductive adhesive or by soldering. In still further embodiments, the at least one electrical circuit may comprise silver and/or copper. In still further embodiments, the at least one electrical circuit is a printed electrical circuit or a lithographically etched electrical circuit.

In yet still further embodiments of the invention, the conductive members may be one or more of the group selected from a wire, a conductive yarn, a screen-printed conductive path and combinations thereof.

In further embodiments of the invention, the device may further comprise a power supply unit and an electrical interconnect to connect the power supply unit to the visible light source apparatus. For example, the electrical interconnect may comprise a first flexible interconnect component that is attached to the textile or fabric and to the second end of the at least two conductive members.

In still further embodiments, the electrical interconnect may further comprise a mechanical coupling mechanism, optionally wherein the mechanical coupling mechanism comprises at least one section containing at least one groove on the contact surface of the first housing arranged to releasably bind to a complementary projection on the contact surface of the second housing or vice versa.

In yet still further embodiments of the invention:
 (a) the power supply unit may comprise a battery and a DC-DC boost converter; and/or
 (b) the power supply unit may further comprise a switching module adapted to control a number of lighting modes of the visible light source; and/or
 (c) the power supply unit may further comprise an ambient light detector adapted to control the brightness of the visible light source based upon the ambient light conditions, optionally wherein one or more of the lighting modes of the switching module is controlled fully or in part by the ambient light detector; and/or
 (d) a proximity sensor to control the brightness depending on the closeness to an object; and/or
 (e) a sound detector to control the brightness depending on the ambient volume; and/or (f) a temperature sensor to control the brightness depending on the temperature.

In yet still further embodiments, the textile and/or fabric may be formed into a garment or a bag. For example, when the textile and/or fabric is formed into a garment, the garment is selected from shorts, socks, T-shirts, trousers, leggings, shirts, and caps.

In certain embodiments, the flexible and conformable visible light source apparatus may have a thickness that is from 350 μm to 600 μm (e.g. from 400 μm to 500 μm).

In certain embodiments, the flexible and conformable visible light source apparatus may have a bending radius of from 5 mm to 10 mm (e.g. from 5.5 mm to 8 mm). In additional or alternative embodiments, when the flexible and conformable visible light source apparatus has more than one visible light source, the distance between the visible light sources is at least 1 cm (e.g. from 1 cm to 50 cm, such as from 1.5 cm to 10 cm).

In yet still further embodiments, the at least one transparent polymer layer may be a transparent material selected from one or more of the group consisting of TPU, a silicone-based polymer, a plasma-treated textile substrate and a water repellent textile substrate, optionally wherein the at least one transparent polymer layer may be a material selected from one or more of the group consisting of TPU and a silicone-based polymer.

In yet still further embodiments, when the at least one visible light source is positioned to provide light towards the textile or fabric, an opening in the fabric or textile may align with the at least one visible light source.

In still further embodiments, the flexible substrate may be made from one or more of the group selected from polyethylene naphthalate, polyethylene terephthalate, polyimide.

In yet still further embodiments, the device of the current invention may be washed at least up to 30 times (e.g. at least up to 50 times, such as at least up to 100 times) without affecting the function of the flexible and conformable visible light source apparatus attached to the textile or garment.

In yet further embodiments, the at least two conductive members may be electrically insulated across their entire length, except at a first portion adjacent to and including the first end and a second portion adjacent to and including the second end, both of which are uninsulated and the first portions of the at least two conductive members are fully encapsulated by the at least one transparent polymer layer.

In embodiments of the invention where the device forms or is part of a garment, then the flexible and conformable visible light source apparatus may be located at any position in said garment. For example, the flexible and conformable visible light source apparatus might not restrict the movement of a wearer of a garment and/or cause the wearer any discomfort (e.g. due to the thinness of the device).

Yet further aspects and embodiments of the current invention are disclosed in the following numbered clauses.

1. A visibility-enhancing device comprising:
 a textile or fabric having an internal surface and an external surface; and
 a flexible and conformable visible light source apparatus attached to the textile or fabric, wherein the visible light source apparatus comprises:
  at least one visible light source that is positioned towards the internal surface of the textile or fabric and/or is positioned to provide light at an angle that is substantially perpendicular to the internal surface of the textile or fabric;
  at least two conductive members having a first end and a second end, the first end is connected to the at least one visible light source and the second end is adapted to connect to a power source; and
  at least one transparent polymer layer that encapsulates the entirety of the at least one visible light source and at least part of the at least two conductive members.

2. The device according to Clause 1, wherein the visible light source is selected from one or more of the group consisting of a light emitting diode (LED), an organic light emitting diode (OLED) and an electroluminescent material, optionally wherein the visible light source further comprises an optical channelling device (e.g. an optical fibre).

3. The device according to Clause 1 or Clause 2, wherein the visible light source is attached to the textile or fabric by the at least one transparent polymer layer.

4. The device according to any one of the preceding clauses, wherein the flexible and conformable visible light source apparatus further comprises at least one flexible substrate with at least one electrical circuit thereon, where the at least one visible light source is attached to the at least one flexible substrate through the at least one electrical circuit and the at least one electrical circuit is connected to the at least two conductive members, optionally wherein:
 (a) the at least one visible light source is attached to the at least one electrical circuit by an isotropic conductive adhesive; and/or
 (b) the at least one electrical circuit comprises silver and/or copper; and/or
 (c) the at least one electrical circuit is a printed electrical circuit or a lithographically etched electrical circuit.

5. The device according to any one of the preceding clauses, wherein the conductive members may be one or more of the group selected from a wire, a conductive yarn, a screen-printed conductive path (e.g. a conductive paste) and combinations thereof.

6. The device according to any one of the preceding clauses, wherein the device further comprises a power supply unit and an electrical interconnect to connect the power supply unit to the visible light source apparatus.

7. The device according to Clause 6, wherein the power supply unit comprises a battery and a DC-DC boost converter.

8. The device according to Clause 7, wherein the power supply unit further comprises a switching module adapted to control a number of lighting modes of the visible light source.

9. The device according to Clause 7 or Clause 8, wherein the power supply unit further comprises an ambient light detector adapted to control the brightness of the visible light source based upon the ambient light conditions, optionally wherein one or more of the lighting modes of the switching module is controlled fully or in part by the ambient light detector.

10. The device according to any one of the preceding clauses, wherein the textile or fabric is formed into a garment or a bag, optionally wherein when the textile or fabric is formed into a garment, the garment is selected from shorts, socks, T-shirts, trousers, leggings, shirts, and caps.

11. The device according to any one of the preceding clauses, wherein the flexible and conformable visible light source apparatus has a thickness that is from 350 μm to 600 μm.

12. The device according to clause 11, wherein the flexible and conformable visible light source apparatus has a bending radius from 5 mm to 10 mm.

13. The device according to clause 11, wherein when the flexible and conformable visible light source apparatus has more than one visible light source, the distance between the visible light sources is at least 1 cm.

14. The device according to any one of the preceding clauses, wherein the at least one transparent polymer layer is a material selected from one or more of the group consisting of TPU, a silicone-based polymer, a plasma-treated textile substrate and a water repellent textile substrate, optionally wherein the at least one transparent polymer layer is a material selected from one or more of the group consisting of TPU and a silicone-based polymer.

15. The device according to any one of the preceding clauses, wherein, when the at least one visible light source is positioned to provide light towards the textile or fabric, an opening in the fabric or textile aligns with the at least one visible light source.

16. The device according to any one of Clauses 4 to 15, wherein the flexible substrate is made from one or more of the group selected from polyethylene naphthalate, polyethylene terephthalate, polyimide.

17. The device of any one of the preceding clauses, wherein the device is capable of being washed at least up to 30 times (e.g. at least up to 50 times, such as at least up to 100 times) without affecting the function of the flexible and conformable visible light source apparatus attached to the textile or garment.

DRAWINGS

Some embodiments of the present invention are described more fully hereinafter with reference to the accompanying drawings. In the drawing figures, dimensions may be exaggerated for clarity of illustration. Like reference numerals refer to like elements throughout.

DESCRIPTION

The subject matter of the current invention seeks to solve one or more of the problems described hereinbefore with regard to conventional solutions to the issues faced by people who have to venture outside in low-light conditions.

In the following detailed description, only certain embodiments of the present invention have been shown and described, simply by way of illustration. As those skilled in the art would realise, the described embodiments may preferably be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

An important prerequisite for electronics-in-garments is unobtrusive integration. This means that the original textile properties should be preserved even when the electronic functionality has been added to the garment. This means that the electronics have to be very thin and flexible to allow unobtrusive integration. In addition, the garments should withstand routine use and cleaning. This may include hand- or machine-washing and waterless washing (such as dry cleaning, self-washing garments etc . . . )

Figure 1:
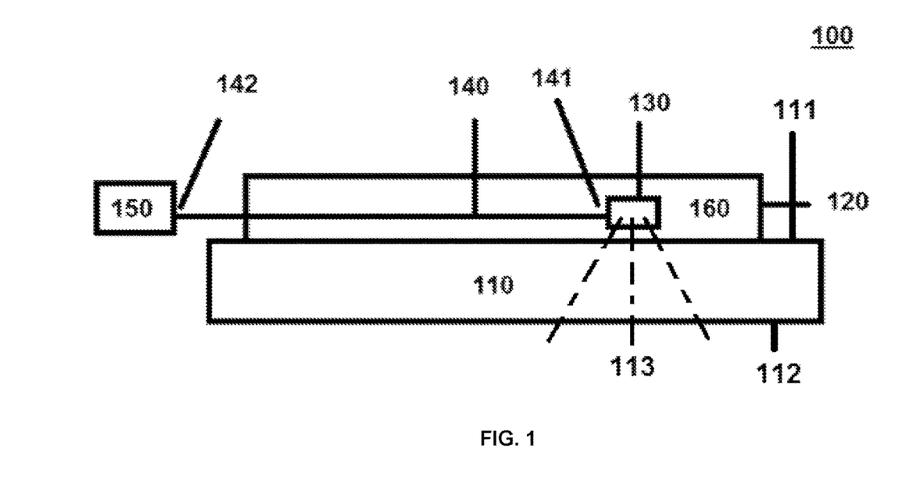
FIG. 1 schematically depicts an embodiment of the device of the current invention.

Given this, and as depicted in FIG. 1, the present invention seeks to provide a visibility-enhancing device 100 comprising:
  a textile or fabric 110 having an internal surface 111 and an external surface 112; and
  a flexible and conformable visible light source 120 apparatus attached to the textile or fabric 110, wherein the visible light source apparatus 120 comprises:
    at least one visible light source 130 that is positioned towards the internal surface of the textile or fabric (depicted) and/or is positioned to provide light at an angle that is substantially perpendicular (not depicted) to the internal surface of the textile or fabric;
    at least two conductive members 140 having a first end 141 and a second end 142, the first end is connected to the at least one visible light source and the second end is adapted to connect to a power source 150; and
    at least one transparent polymer layer 160 that encapsulates the entirety of the at least one visible light source and at least part of the at least two conductive members.

The visible light source 130 may be positioned to provide light towards the textile or fabric. In this embodiment, as discussed in more detail below, the textile or fabric may contain a hole that is aligned with the light source to enable light 113 to shine through the textile without impediment, but this is optional, as the light will still penetrate the textile or fabric and provide illumination. Alternatively or (when there is more than one visible light source) additionally, the visible light source 130 may be positioned to provide light at an angle that is substantially perpendicular to the textile or fabric, which may provide the desired visibility enhancement in an aesthetically pleasing manner, while shining through the textile or fabric.

Advantages associated with this device include the reduced thickness of the device, which results in improved comfort to the wearer of a garment that incorporates said device. That is, the wearer does not feel any impediment on their range of movements or in the feel of the garment caused by the device. A further advantage of the device as described in more detail below is the fact that the resulting device is washable (e.g. machine washable) multiple times, while still being capable of providing illumination following the washing cycle. Thus, the device provided herein provides a combination of both comfort and durability.

The textile or fabric 110 may be of any suitable material. For example, when the textile or fabric is in the form of a garment, the textile or garment may be made of one or more of any suitable natural or synthetic material (such as nylon, polyester, cotton, rayon, leather, flax, wool, ramie, silk, fur, polyesters, bamboo, jute, hemp, elastane, flannel or blends thereof. These materials may be in the form of woven, knit, non-woven or fibre like structures.

The flexible and conformable visible light source apparatus 120 may be attached to the textile or fabric 110 in any suitable manner. For example, the visible light source apparatus 120 may be attached by the use of adhesives, stitching, ultrasonic welding or heat-bonding via the transparent polymer layer 160 to the textile or fabric 110. The visible light source 130 may be selected from one or more of the group consisting of a light emitting diode (LED), an organic light emitting diode (OLED) and an electroluminescent material. The at least one transparent polymer layer is a material selected from one or more of the group consisting of TPU, a silicone-based polymer, a plasma-treated textile substrate and a water repellent textile substrate (e.g. TPU and/or a silicone-based polymer).

In certain embodiments, the visible light source apparatus 120 may further comprise an optical channelling device (e.g. an optical fibre) to provide additional lighting effects.

When used for illumination purposes, the "visible light source" operates at wavelength visible to the human eye (i.e. from 495-570 nm). In certain embodiments that may be mentioned herein, the visible light source 130 may have a dominant wavelength of 527 nm.

Figure 2A:
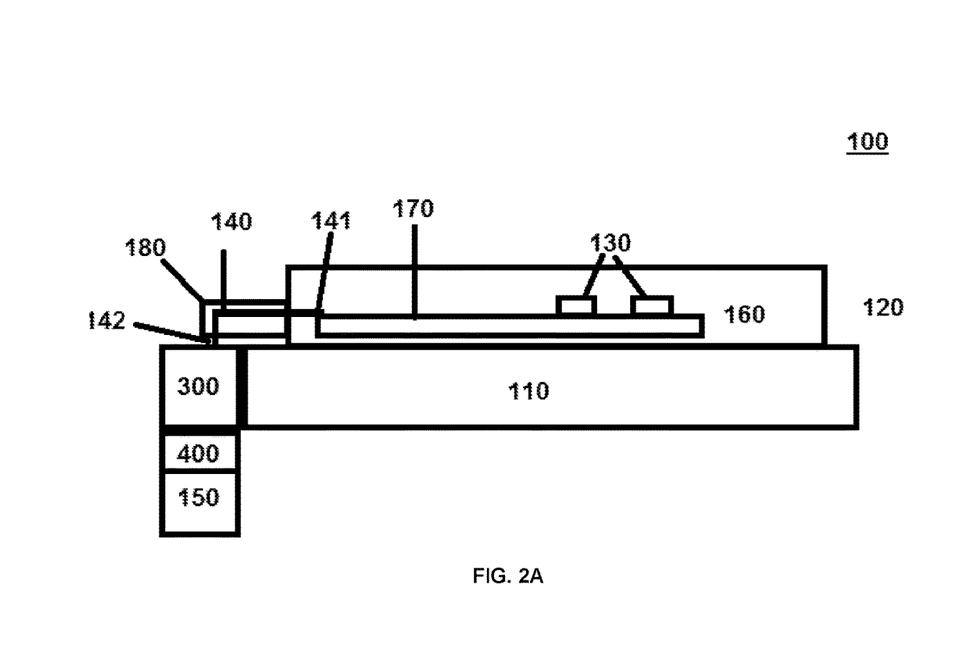
FIG. 2A schematically depicts an embodiment of a further device of the current invention.

As depicted in FIG. 2A, the flexible and conformable visible light source apparatus 120 of the device 100 may further comprise at least one flexible substrate 170 (e.g. the flexible substrate is made from one or more of the group selected from polyethylene naphthalate, polyethylene terephthalate and polyimide) with at least one electrical circuit thereon, where the at least one visible light source 130 (depicted as two visible light sources in this embodiment) is attached to the at least one flexible substrate through the at least one electrical circuit (e.g. the attachment may be by use of an isotropic conductive adhesive or by soldering) and the at least one electrical circuit is connected to the at least two conductive members 140 (e.g. the at least two conductive members 140 may be one or more of the group selected from a wire, a conductive yarn, a screen-printed conductive path (e.g. a conductive paste) and combinations thereof). In certain embodiments, the at least one electrical circuit may comprise silver and/or copper. It will be appreciated that in all aspects and embodiments mentioned herein, the flexible substrate and the electrical circuit thereon are fully encapsulated within the at least one polymer layer.

When used herein, the term "electrical circuit" may relate to a printed circuit (e.g. a screen-printed circuit) or by lithographic etched circuit (e.g. a lithographically etched copper circuit).

FIG. 2A also depicts the use of an electrical interconnect 300, 400 to connect the power source 150 (e.g. a power supply unit) to the visible light source apparatus, such that the power source is easily detached from the garment and/or textile. As shown, second ends 142 of the conductive members 140 interface with the interconnect portion 300 attached to the garment 110. In order to reduce the exposure of the conductive members 140, the majority (or all, as described below) of the wiring that is not encapsulated within the polymer layer 160 may be encapsulated, for example through the use of an additional polymeric component 180 (which may be of the same material described in respect of the polymer layer 160) to help protect the conductive members 140 from exposure to the environment. Alternatively or additionally, the exposed wires may be surrounded by an additional textile layer, so as to provide additional comfort to the wearer, while also providing electrical insulation. It will be understood that a portion of the conductive members 140 are left unencapsulated so as to enable engagement into the interconnect portion 300, though any remaining exposed wiring is covered (e.g. as described above) once the connection to the interconnection portion 300 has been established. The power source 150 also further comprises an interconnect portion 400 to enable transfer of power from the power source to the flexible and conformable visible light source apparatus 120.

For the avoidance of doubt, when the device is worn as part of a garment, the at least one visible light source is positioned to provide light towards the textile or fabric and away from the body of the wearer or is positioned to provide light at an angle that is substantially perpendicular to the textile or fabric. The former is discussed in more detail in FIG. 2B.

Figure 2B:
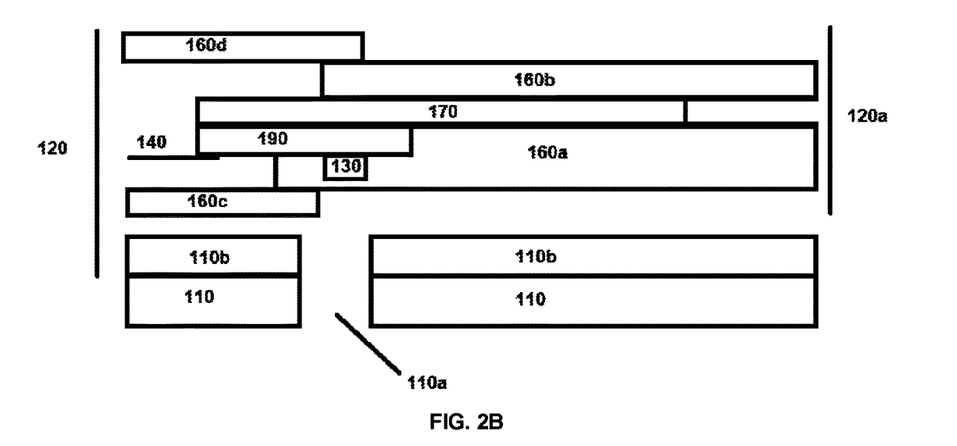
FIG. 2B schematically depicts an embodiment of yet a further device of the current invention.

FIG. 2B depicts a further embodiment of the flexible and conformable visible light source apparatus 120, when attached to a garment 110, where the visible light source 130 faces away from the body of a wearer. As shown, the flexible substrate 170 (e.g. a PEN substrate) is attached to the visible light source 130 by way of a silver conduction pad 190, with the visible light source 130 being bonded to the surface of the conduction pad 190 by an isotropic conductive adhesive. In addition, the silver conduction pad 190 of this embodiment is in conductive contact with the conductive member 140. As shown, the flexible and conformable visible light source apparatus 120 is encapsulated in a number of layers of encapsulating polymer (160a-d). Although not necessary, a hole 110a can be cut into the fabric 110 to enhance the light emitted from the visible light source to the outside world (combinations of visible light sources covered and visible light sources that are exposed by holes 110a are contemplated). Further, to enhance the bonding of the visible light source apparatus 120 to the fabric, an additional polymer layer (e.g. made of the same materials previously described for polymer layer 160) may be used. In this embodiment, the polymeric layer 110b is heat-bonded to the fabric 110 and the visible light source apparatus 120 is then heat-bonded to the polymeric layer 110b. It will be appreciated, that a single layer of unbroken polymer may be heat-bonded, with a hole then being cut through the fabric to generate hole 110a. Alternatively, hole 110a may be generated first, followed by heat bonding two separate polymer layers 110b to either side of hole 110a. In certain cases, the hole 110a may be sealed with a different material, such as a transparent TPU or silicone. In certain embodiments, a combination of visible light sources facing away from the body is also contemplated, where some of the visible light sources are covered by the original material, some are exposed by holes 110a and some are exposed by holes 110a, but which holes are sealed with a different material (e.g. TPU or silicone). Further, it will be appreciated that the component layers of 120a may be inverted so that the visible light source 130 faces towards the wearers skin instead. In this arrangement, hole 110a may be absent.

It will be appreciated that the arrangement in FIG. 2B can be adapted so that the visible light source 130 directs its light in a substantially perpendicular manner to the textile or fabric. That is, the light from the visible light source 130 is directed between the textile or fabric and, when worn, a body of the user. This may result in a more aesthetically pleasing light being provided by the device. In this arrangement, there may be no holes in the fabric or textile, or there may be multiple holes if that is desired to enhance the aesthetic properties of the light shining through the textile or fabric.

In order to reduce the size of the device, and ensure a suitable bending radius (e.g. from 5 mm to 10 mm), the flexible visible light source is kept as thin as possible (e.g. from 350 µm to 600 µm). To accomplish this, the flexible substrate 170, polymer layers 160b-d and polymer layers 110b may have a thickness of 75 µm, while polymer layer 160a may have a thickness of 160 µm. This arrangement may provide the visible light source (e.g. an LED or an OLED) with impact protection and enable the flexible and conformable visible light source apparatus to survive washing. For example, such a garment may be capable of being washed at least up to 30 times (e.g. at least up to 50 times, such as at least up to 100 times) without affecting the function of the flexible and conformable visible light source apparatus attached to the textile or garment. It will also be appreciated that the thickness of the device is minimised in such a way that user comfort is enhanced.

Figure 2C:
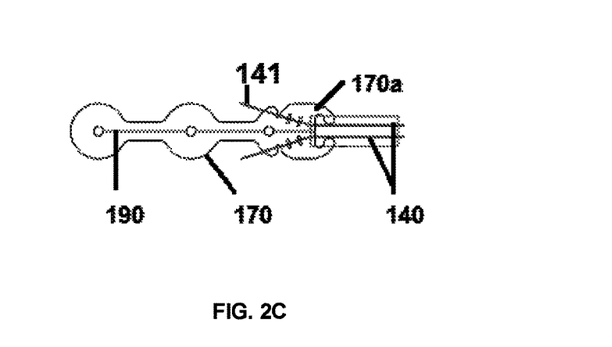
FIG. 2C depicts a substrate 170 that may be used in embodiments of the current invention.

FIG. 2C depicts a flexible substrate 170 according to an embodiment of the current invention. Flexible substrate 170 may be made from one or more of the group selected from polyethylene naphthalate, polyethylene terephthalate and polyimide. An electrical circuit depicted schematically by 190 is applied to the surface (e.g. by printing the circuitry or by lithographically patterning a circuit), where the circuitry may comprise silver and/or copper and then the visible light source 130 (not shown) is attached to the flexible substrate (e.g. by use of an isotropic conductive adhesive or by soldering, optionally followed by underfilling of the visible light source. The flexible substrate is then die cut or patterned (e.g. by laser cutting) to provide the final form factor shown, which uses a lobstered shape to engage with the first ends 141 of the two conductive members 140. It will be appreciated that any other suitable means of engaging the conductive members 140 may be used. As shown, the first ends 141 of the two conductive members 140 subsequently are placed into conductive contact with the electrical trace 190 to enable illumination of the visible light source.

The flexible and conformable visible light source apparatus may have a thickness that is from 350 µm to 600 µm. In addition, the flexible and conformable visible light source apparatus may have a bending radius of from 5 mm to 10 mm. When the flexible and conformable visible light source apparatus has a thickness that is from 350 µm to 600 µm, the device may be particularly comfortable to wear as part of a thin garment (e.g. a single-layer t-shirt, shirt etc), this comfort may be further improved when the flexible and conformable visible light source apparatus also has a bending radius of from 5 mm to 10 mm. In certain embodiments, when there is more than one visible light source, it may be useful to ensure that there is a minimum separation between the visible light sources (e.g. LEDs) used as part of the flexible and conformable visible light source apparatus is at least 1 cm (e.g. from 1 cm to 10 cm).

When used herein, "LED" refers to all types of LEDs unless specifically specified otherwise, for example a conventional LED and an OLED. As an example where "LED" is restricted in meaning, when the phrase "the group consisting of a neon light source, a light emitting diode (LED), an organic light emitting diode (OLED) and an electroluminescent material" is used it will be understood that "LED" relates to all types of LED except for OLEDs. When used herein, "OLED" refers to all kinds of OLEDs.

In certain aspects and embodiments of the invention, the total thickness of the visibility-enhancing device may be from 700 µm to 2 mm. It will be appreciated that the lower range may be particularly suitable for use in athletics wear, while the higher end of the range may be suitable for use in the manufacture of a garment/device where a thick layer of fabric may be useful (e.g. a jacket). Particular thicknesses that may be mentioned herein include, but are not limited to from 700 µm to 1,500 µm, such as from 800 µm to 1,500 µm.

The electrical interconnect may be any suitable electrical interconnect, provided that the interconnect is capable of enabling power to be transferred from a power source to the visible light source(s), such that illumination of the visible light sources is accomplished. For example, this may relate to a standard plug and socket arrangement, a releasable snap-fit connector with male and female component parts, or conductively connectable (and releasable) metal rivets. Alternatively, the electrical interconnect may contain a flexible arrangement comprising an electrical contact surface adapted to be attached to a power source with a complementary electrical contact surface.

Figure 3:
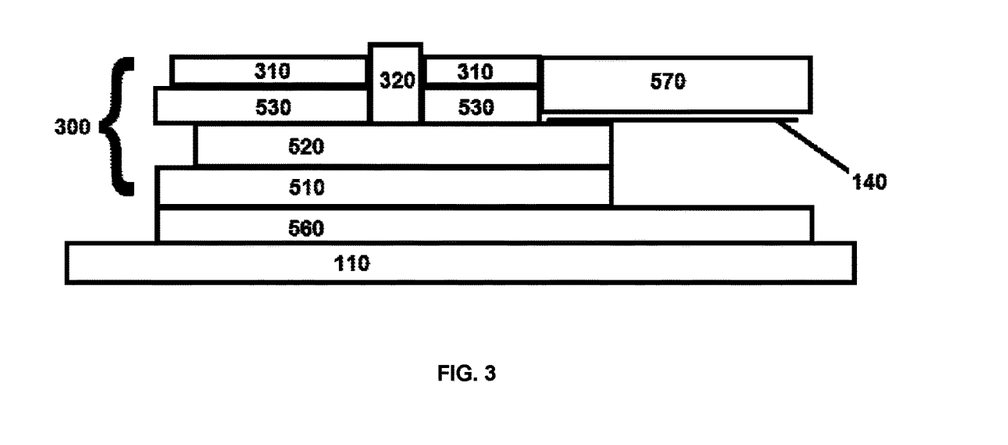
FIG. 3 schematically depicts a flexible interconnect component that may be used in an embodiment of the current invention.
Figure 4:
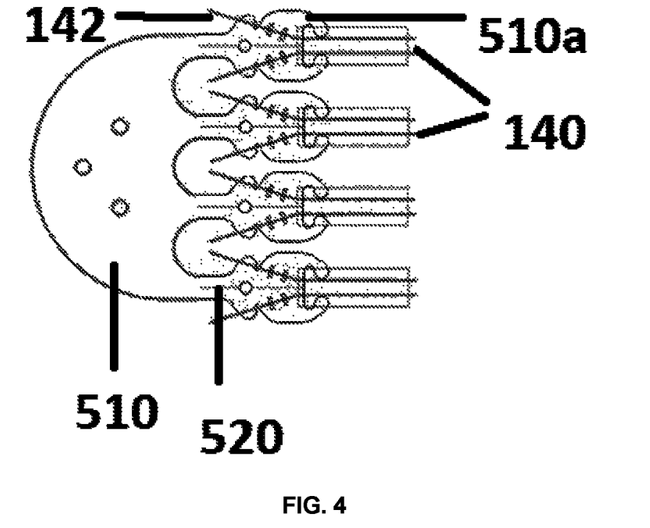
FIG. 4 depicts a connection portion that may be used in embodiments of the current invention.

FIG. 3 helps to illustrate a suitable arrangement of a flexible interconnection component that may be used as part of a garment or textile/fabric 110, which may be placed on the inner or on the external surface of the textile or fabric. In FIG. 3, the flexible connection component 300 comprises a number of flexible layers (510-530) that are bonded to a layer of fabric 110, which may be the body the garment by way of a polymeric layer 560 (e.g. made from a thermoplastic polyurethane) that acts as a barrier material to insulate the electrical components of the flexible interconnection component 300 from environmental factors (e.g. sweat and body fluids from the body of the wearer), while helping to insulate the wearer from the electrical current produced by the device in operation. In this embodiment, the flexible interconnection component 300 contains a flexible base layer 510 (e.g. made from poly(ethylene 2,6-naphthalene dicarboxylate); PEN) onto which is bonded a flexible layer of silver 520 (e.g. a screen-printed layer of silver), which provides the conductive and/or data connectivity in this embodiment. The silver (or copper) layer 520 is in direct conducting contact with a male snap-fit conductive member 320, that is arranged to reversibly mate with a female snap-fit conductive member (not shown), as well as two or more conductive wires 140 that extend laterally from the surface of the silver layer 520. As shown, the male member 320 is situated in a hole through two layers of the a flexible interconnection component 300, an electrically insulating layer 530 (e.g. made from a thermoplastic polyurethane) and a first contact surface layer 310, which may be made of any of the materials described above. To help protect the conductive wires 140, a further layer of an insulating polymer 570 may be laid on top of it to encapsulate and protect it and the silver layer 520 from environmental factors (the encapsulating being achieved in combination with the other insulating layers 530 and 560. It will be appreciated that the wire 140 may be encapsulated in an insulating material over its entire length, except for the terminus, which is in conductive contact with an electrical device or sensor as described herein. In certain embodiments, the first flexible interconnection component may also be encased in a covering of fabric attached to the layer of fabric 110 to form a pocket suitable to house the first flexible component and the second component. This arrangement is advantageous when the second component incorporates a power supply unit.

FIG. 3 depicts the base layer 510 and silver (or copper) layer 520 that may be used to distribute electricity from the flexible interconnection component 300 to the flexible light apparatus 120 (e.g. in the embodiment of FIG. 1-2B). As shown, the base layer and conductive layering are cut into a defined shape to enable the distribution of power through multiple conductive members 140. The construction and shaping of these layers may be conducted using the techniques discussed in respect of the flexible substrate 170 hereinbefore.

While the female snap-fit member is not shown, it will be appreciated that this may be housed on an interconnection component that contains additional electrical components, such as a power supply unit, and may be rigid or flexible. It will be appreciated that any suitable interconnection arrangement may be used herein. The primary purpose of the interconnection arrangement is to provide a coupling that enables power from a removable power supply unit to be supplied to the visibility-enhancing device of the current invention.

The power supply unit may be any suitable power supply unit that can connect to the lighting module attached to the textile/fabric or garment. In certain embodiments, the power supply unit may comprise a battery and a DC-DC boost converter. In further embodiments, the power supply unit may further comprise a switching module adapted to control a number of lighting modes of the visible light source. In yet further embodiments, the power supply unit may further comprise an ambient light detector adapted to control the brightness of the visible light source based upon the ambient light conditions (e.g. wherein one or more of the lighting modes of the switching module is controlled fully or in part by the ambient light detector).

Alternatively or additionally, the brightness of the device may also be controlled by:
(a) a proximity sensor to control the brightness depending on the closeness to an object; and/or
(c) a sound detector to control the brightness depending on the ambient volume; and/or
(d) a temperature sensor to control the brightness depending on the temperature.

It will be appreciated that the mode selector may make use of none, one or a combination of the above sensors and the light detector (e.g. light dependant resistor) to control the brightness of the visible light sources.

In an embodiment of the invention, the power supply unit may have a housing that encloses a battery (e.g. a rechargeable Li-ion battery), a switch and a printed circuit board (PCB) that houses the relevant electronics to operate the various component parts of the power supply unit depicted and described above. The housing contains a second interconnect member adapted to connect to the interconnect member attached to the fabric (e.g. of a garment). In addition the power supply unit may also contain a USB port, which may be used to charge the battery, when said battery is a rechargeable battery. It will be appreciated that in certain embodiments that a USB port may be absent and alternative means of recharging the battery may be incorporated, such as wireless recharging means or apparatus.

FIGS. 5 to 8 describe the arrangement of an embodiment of the entire integrated device 100 as and how the device 100 may be used.

Figure 5:
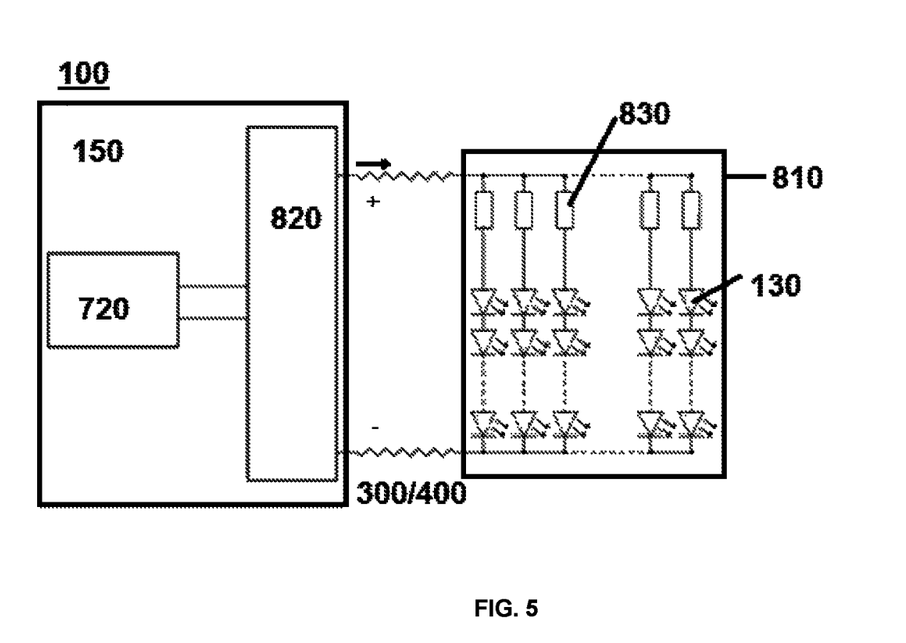
FIG. 5 depicts an electronic circuit schematic of an embodied device according to the current invention.
Figure 6:
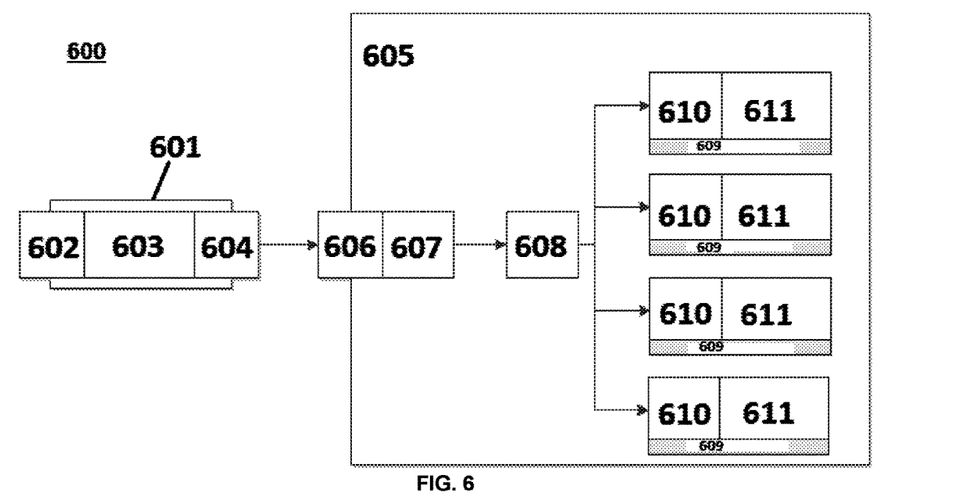
FIG. 6 depicts a full device according to the current invention in schematic form.
Figure 7:
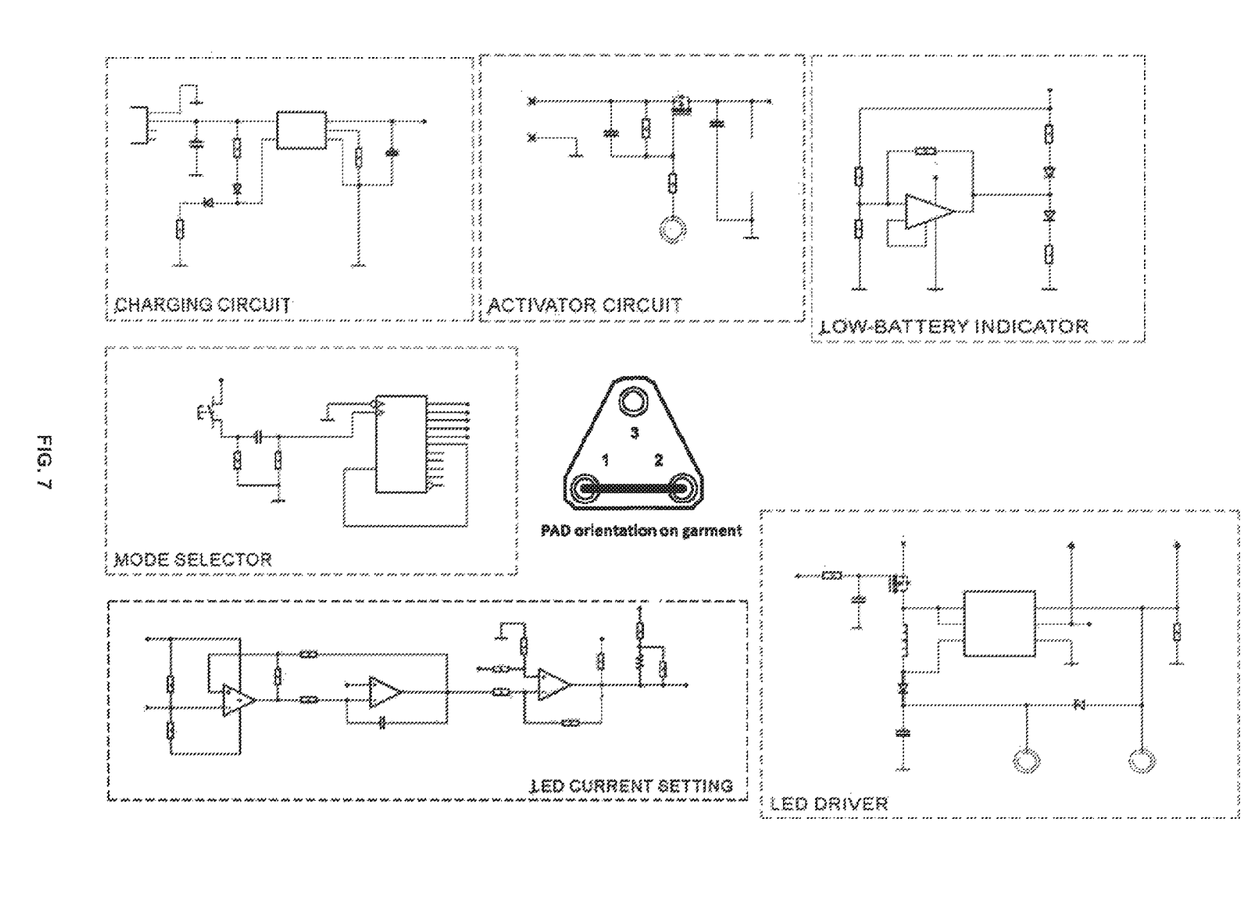
FIG. 7 depicts the electrical circuits used within the power module of an embodiment of the invention, though not shown in connection.

FIG. 5 depicts the device 100 as an electronic circuit schematic. As shown, the device 100 requires the presence of a detachable power module 150 that is connected to the wiring of the lighting module 810 by an electrical interconnect 300/400. As depicted, the battery module may contain a battery 720 (e.g. a rechargeable Li-ion battery operating at around 3.7 Volts) and a DC-DC Boost Converter 820 (e.g. to step-up the voltage from 3.7 Volts to 24 Volts). In this embodiment, the lighting module contains several lighting source strips integrated into a textile (not shown) containing the following either LEDs or OLEDs that are encapsulated in a flexible polymer (not shown), as discussed in more detail hereinafter. In certain embodiments of the invention, the battery module may further contain all of the power and driving electronics necessary to operate the device, as illustrated in FIGS. 6 and 7. To help protect the visible light sources 130, a current-limiting resistor may be added.

FIG. 6 depicts a full system 600 according to the current invention in schematic form. As depicted, the power supply unit 601 contains a USB connector 602 a power module 603 (which contains a battery, a DC-DC converter, switching module, automatic light sensor and electronics to drive these components on a printed circuit board) and an interconnect 604 to contact the interconnector (606; i.e. contact pads) on a garment 605 (though this may be any other object made from a fabric or a textile). The garment 605 contains an interconnect 606 to interface with the interconnect 604 of the power supply unit and the (e.g. the interconnections described herein, or any other suitable interconnector), components 607 to transfer the electrical current from said interconnect 606 to a conductive yarn 608 (this may also be a wire or a printed conductive path (e.g. a conductive paste)) to one or more lighting strips 609, which lighting strips 609 comprise a circuit module interconnection 610 and a lighting module 611.

Figure 8:
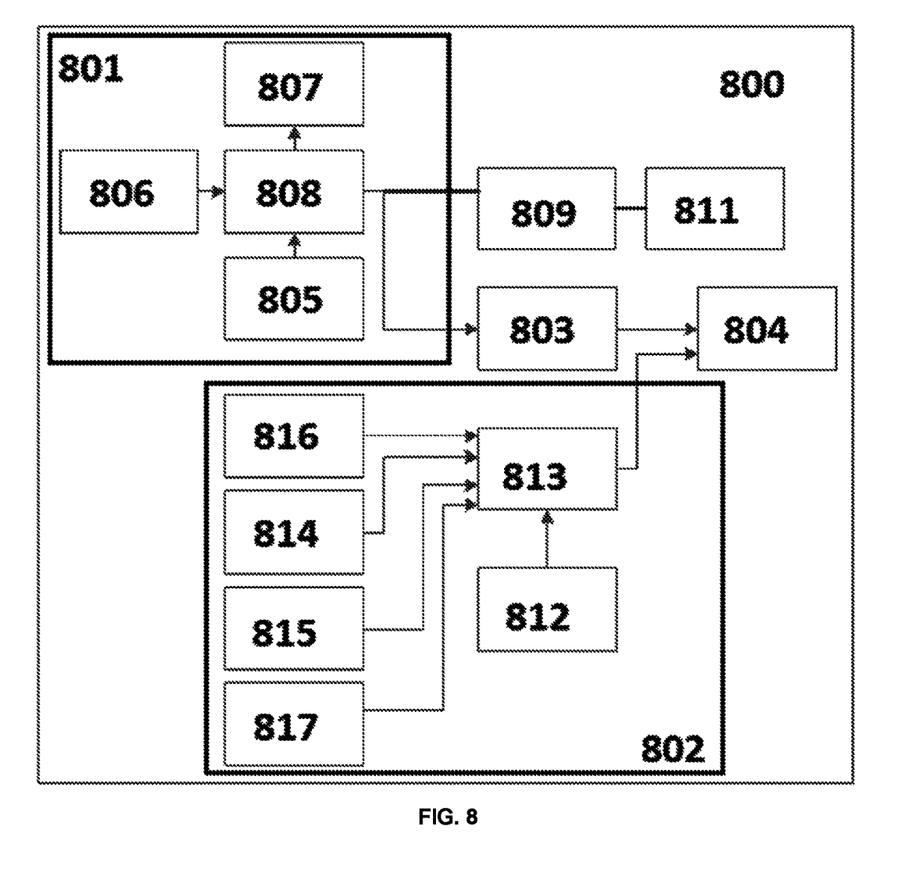
FIG. 8 describes the physical system architecture and interaction of these components in an embodiment of the current invention.

FIG. 7 more clearly depicts the electrical circuits used within the power module of an embodiment of the invention, though not shown in connection, whereas FIG. 8 describes the physical system architecture and interaction of these components.

FIG. 8 depicts a power module according to an embodiment of the current invention. The Power module 800 can be separated into four entities by their main function: charging 801, mode selector 802, DC-DC converter 803 and detachable interconnection 804. The main function of the charging part of the power module 800 is charging the battery 805 of the lighting system by means of a USB connector 806 and providing the user with feedback by means of a charging indicator LED 807, all connected by a charging interface/circuit 808. While the device depicted here uses a separate USB connector 806 to achieve the charging, it is contemplated that the interconnect system, as described in more detail herein can also achieve the same effect. In addition, it is contemplated that the power module could also make use of swappable batteries (e.g. alkaline batteries).

When the power module 800 is plugged into an USB wall-mount adaptor or USB port, power will be drained from the attached power source in order to charge the internal battery 805 of the power module. The charging interface will regulate the current and voltage levels to charge the battery 805 (e.g. any rechargeable battery, such as a Li poly battery and a Li-ion battery). The power module 800 will monitor the power level of the battery to ensure proper charging and the charging interface 808 will also drive an indicator LED providing the user with visual feedback about the charging status of the battery (e.g. red while charging, green/off when full). A voltage comparator 809 is implemented into the power module to warn the user that the battery only has 20% charge left by lighting up a red LED 811 (i.e. a battery low indicator).

In order to control the lighting system, the battery module may also contain a mode selector 802 that is responsible for setting the desired lighting mode of the lighting apparatus. The mode selector 802 comprises a tactile switch 812, light mode selector circuitry 813, current regulating resistors for 50% (814) and 100% (815) brightness settings, a light dependent resistor 816 and a pulse generator circuit 817. These components can be used to select any one of the following modes, in the order presented.

Off
50% brightness setting
100% brightness setting
Automatic brightness (by light dependent resistor; LDR)
"Breathing" Animation with automatic brightness (by LDR and pulse generator)

By default, the system will be on the "Off state". This means that no light will be produced by the system. By pressing the tactile switch, the selector will move forward one mode per click. As noted above, attached to the mode selector are different sub systems to create the different modes. An ambient light sensor in the form of an LDR is used in the last 2 modes to allow the system to respond to the environmental lighting conditions. A pulse generator may be incorporated to generate a varying breathing-like animation that can be used in the last mode. The mode selector selects one or more of the sub-systems (as required) and electrically connects them to the DC-DC converter 803.

The main function of the DC-DC converter 803 is to scale the voltage level of the battery up to a higher potential in order to drive the lighting modules. This is needed to compensate for voltage drops over the circuit on the garment that connects the lighting modules to the power module. The DC-DC converter may be set to the required current based on input from the mode selector.

A voltage comparator 809 is included in the power module to measure the battery's charge level. When the battery charge gets below 20%, a red LED will light up 811, notifying the user that the system should be charged again.

A re-attachable interconnection 804 is the bridge between the power module and the garment. It makes an electrical interconnection, allowing power to flow from the power module's DC-DC converter 803 to interconnect component attached to the power module. As discussed in more detail hereinbefore, the interconnect may be made using interconnection components on the power module and the garment, which allowed the connection to be made and broken in easily. This allows the power module and garment to be bonded for use and separated for charging and washing with little difficulty.

Alternatively or additionally, the brightness of the device may also be controlled by:
(a) a proximity sensor to control the brightness depending on the closeness to an object; and/or
(c) a sound detector to control the brightness depending on the ambient volume; and/or
(d) a temperature sensor to control the brightness depending on the temperature.

It will be appreciated that the mode selector may make use of none, one or a combination of the above sensors and the light detector (e.g. light dependant resistor) to control the brightness of the visible light sources.

Figure 9:
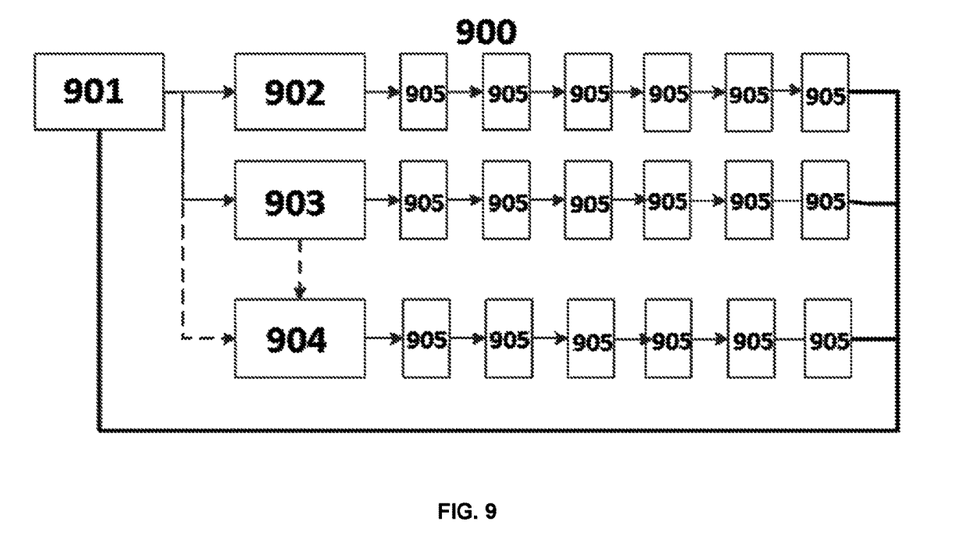
FIG. 9 depicts the lighting module of an embodiment of the current invention.

The garment or textile/fabric component can be split into two main sub-systems: the lighting system and the other half of the re-attachable interconnection. As shown in FIG. 9, the lighting system can contain three lighting modules, the modules provide visual lighting at several locations on the garment or textile/fabric. Each lighting module is a strip with several light emitters 905 (in the embodiment shown, LEDs or OLEDs). The re-attachable interconnection 901 is the bridge between the power module and the garment. The interconnection that forms part of the lighting module makes an electrical interconnection with the corresponding component on the power module, allowing power to flow from the connector pads to the individual lighting modules to light them. As is discussed in more detail hereinbefore, the connection can be made and broken easily, allowing the power module and garment (or textile/fabric) to be bonded for use and separated for charging and washing.

As discussed herein, the textile or fabric may be in the form of a garment or other object made from such materials (e.g. a bag). When the textile or fabric is in the form of a garment, the garment may be any wearable object, such as shorts, socks, T-shirts, trousers, leggings, shirts and caps.

FIG. 9 depicts the lighting module of an embodiment of the current invention. The lighting module has been substantially describe hereinbefore. The lighting module 900 comprises landing pads 901 for the conductive yarn on a textile to interface with the electrical components on the lighting module, which landing pads are connected (e.g. by electrical traces) to one or more current limiting resistors for LEDs (902-904) and multiple LEDs (905).

Figure 10:
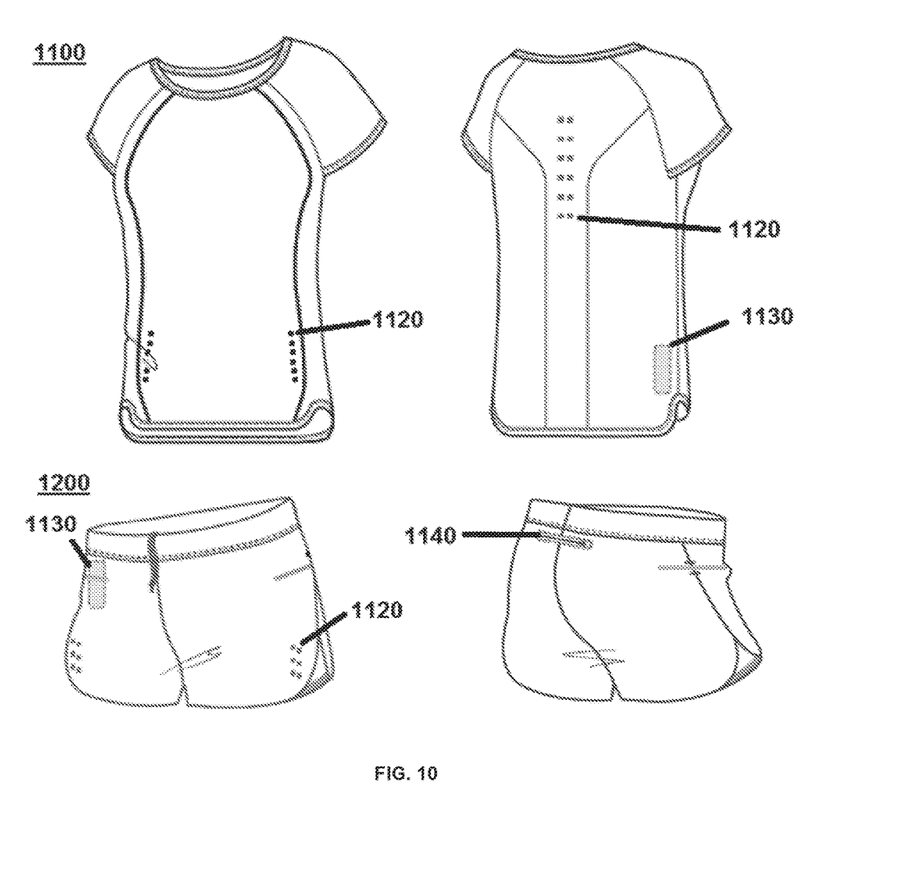
FIG. 10 discloses a T-shirt and shorts according to embodiments of the current invention.
Figure 11:
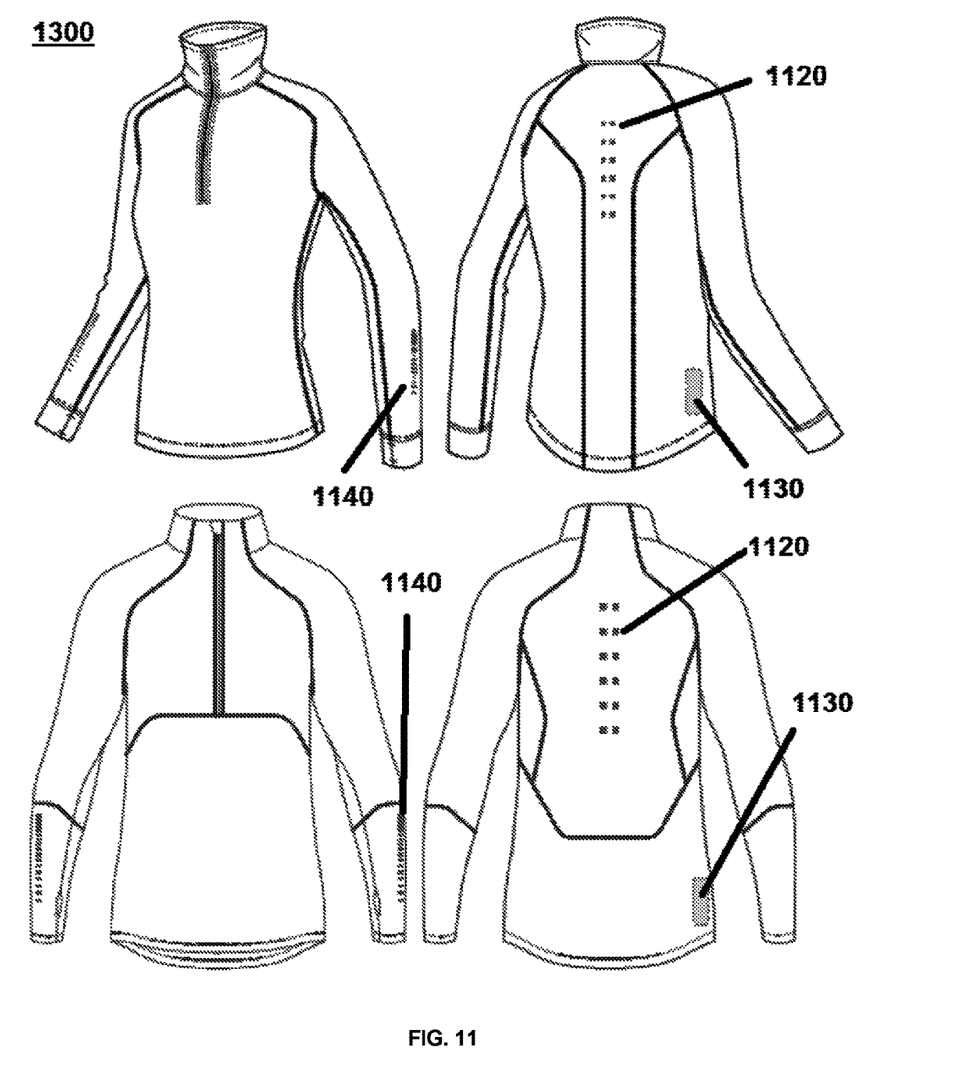
FIG. 11 depicts a long-sleeved shirt 1300 according to an embodiment of the current invention.

FIG. 10 discloses a T-shirt 1100, shorts 1200 and FIG. 11 depicts a long-sleeved shirt 1300 according to embodiments of the current invention, depicting an integrated lighting system in a garment. As shown in these figures, there are lights 1120, which may be one or more of light emitting diodes (LEDs), organic light emitting diodes or an electroluminescent material, that are attached to the front, back and/or sides of the garment to provide illumination. The lights are connected by some form of wiring (not shown) to a power supply unit 1130, which provides power and may perform additional functions as discussed in more detail below. In addition to the lights 1120, the garments may also contain passive reflective strips 1140 to reflect light from the beam of a vehicle and may help make a wearer more visible in low-light conditions.

The embodiments of FIGS. 10 and 11 relate to sports garments with unobtrusive integrated electronics in accordance with the embodiments of the invention disclosed hereinbefore. In these garments, one or more flexible lighting apparatus 120 are embedded into the garment, drastically increasing the visibility of the wearer while performing running exercises, especially in a dim environment. The one or more flexible lighting apparatus 120 contain light engine elements 130 (LED) according to a pre-defined pattern, color and shape. A separate electronics module can be attached and detached from the garment, which incorporates the driving electronics, rechargeable battery and a switch which is the main interface for the user to select the desired lighting mode (on and off/breathing animation/set brightness/automatic brightness).

It will be appreciated that while the current invention may be integrated into sportswear, embodiments of the current invention may also relate to the use of the integrated lighting system in any fabric or textile. In particular, the lighting system may be integrated into any type of garment.

The invention claimed is:

1. A visibility-enhancing device comprising:
   a textile or fabric having an internal surface and an external surface; and
   a flexible and conformable visible light source apparatus attached to the textile or fabric, wherein the visible light source apparatus comprises:
      at least one visible light source that is positioned towards the internal surface of the textile or fabric, such that the light passes through the textile or fabric, from the internal surface to the external surface;
      at least two conductive members having a first end and a second end, where the first end is connected to the at least one visible light source and the second end is adapted to connect to a power source; and
      at least one transparent polymer layer that encapsulates the entirety of the at least one visible light source and at least part of the at least two conductive members, wherein the visible light source is attached to the textile or fabric by the at least one transparent polymer layer.

2. The device according to claim 1, wherein the visible light source is selected from one or more of the group consisting of a light emitting diode (LED), an organic light emitting diode (OLED) and an electroluminescent material.

3. The device according to claim 1, wherein the flexible and conformable visible light source apparatus further comprises at least one flexible substrate with at least one electrical circuit thereon, where the at least one visible light source is attached to the at least one flexible substrate through the at least one electrical circuit and the at least one electrical circuit is connected to the at least two conductive members.

4. The device according to claim 1, wherein the conductive members is one or more of the group selected from a wire, a conductive yarn, a screen-printed conductive path and combinations thereof.

5. The device according to claim 1, wherein the device further comprises a power supply unit and an electrical interconnect to connect the power supply unit to the visible light source apparatus.

6. The device according to claim 5, wherein the power supply unit comprises a battery and a DC-DC boost converter.

7. The device according to claim 6, wherein the power supply unit further comprises a switching module adapted to control a number of lighting modes of the visible light source.

8. The device according to claim 5, wherein the power supply unit further comprises one or more of:
   (a) an ambient light detector adapted to control the brightness of the visible light source based upon the ambient light conditions
   (b) a proximity sensor to control the brightness depending on the closeness to an object;
   (c) a sound detector to control the brightness depending on the ambient volume; and
   (d) a temperature sensor to control the brightness depending on the temperature.

9. The device according to claim 1, wherein the textile or fabric is formed into a garment or a bag.

10. The device according to claim 1, wherein the flexible and conformable visible light source apparatus has a thickness that is from 350 μm to 600 μm.

11. The device according to claim 10, wherein the flexible and conformable visible light source apparatus has a thickness that is from 400 μm to 500 μm.

12. The device according to claim 10, wherein the flexible and conformable visible light source apparatus includes at least one of:
   (a) a bending radius of from 5 mm to 10 mm; and
   (b) more than one visible light source, the distance between the more than one visible light sources is at least 1 cm.

13. The device according to claim 1, wherein the at least one transparent polymer layer is a material selected from one or more of the group consisting of TPU, a silicone-based polymer, a plasma-treated textile substrate and a water repellent textile substrate.

14. The device according to claim 1, wherein when the at least one visible light source is positioned towards the inner surface of the textile or fabric, an opening in the fabric or textile aligns with the at least one visible light source.

15. The device according to claim 3, wherein the flexible substrate is made from one or more of the group selected from polyethylene naphthalate, polyethylene terephthalate, polyimide.

16. The device of claim 1, wherein the device is capable of being washed at bast up to 100 times without affecting the function of the flexible and conformable visible light source apparatus attached to the textile or garment.

17. The device of claim 1, wherein the at least two conductive members are electrically insulated across their entire length, except at a first portion adjacent to and including the first end and a second portion adjacent to and including the second end, both of which are uninsulated and the first portions of the at least two conductive members are fully encapsulated by the at least one transparent polymer layer.

18. The device of any claim 9, wherein the device is part of a garment, then flexible and conformable visible light source apparatus is located at any position in a garment.

19. The device of claim 18, wherein the flexible and conformable visible light source apparatus does not restrict the movement of a wearer of a garment that includes the visible light source apparatus.

* * * * *